Oct. 5, 1937.  F. BURGHAUSER  2,095,167
SCREW PUMP
Filed Feb. 18, 1936

Inventor:
Franz Burghauser
Attorney:
Franks. Appleman

Patented Oct. 5, 1937

2,095,167

UNITED STATES PATENT OFFICE 2,095,167

SCREW PUMP

Franz Burghauser, Nuremberg, Germany

Application February 18, 1936, Serial No. 64,563
In Germany February 26, 1935

3 Claims. (Cl. 103—128)

Screw pumps or axial pumps having one screw with one or several threads on the main spindle cooperating with one or more secondary shafts have the disadvantage, that mutual axial thrust occurs if the flanks or faces of the threads are used for transmitting power from the main spindle to the secondary spindles.

This so-called drive thrust hitherto has been absorbed by axial bearings or by the thrust of the delivered liquid on compensating or equalizing faces. As, however, the drive thrust is not proportional to the pressure of the delivered liquid a precise compensation of the drive thrust by the liquid thrust is not possible.

Constructions are also known according to which the drive thrust is compensated by mounting on the spindles a pair of gear wheels having inclined teeth the inclination of which is opposite to the screw thread. These gear wheels, however, cause noises, require a considerable total length and must be made on special machines. Moreover, the spindle bearings arranged adjacent the gear wheels are subjected to considerably higher stresses than are the bearings arranged adjacent the thread.

All the draw-backs mentioned above are, according to the invention, obviated by the fact, that collars or rings are mounted upon the spindles the conical surfaces of which roll upon each other and absorb the drive thrust.

In the accompanying drawing one modification of the invention is shown by way of example.

The main spindle $a$ drives, by means of the faces of the threads, the two secondary spindles $b$ and $c$. The spindles are guided in bearings and are surrounded by a casing $d$.

Figure 3:
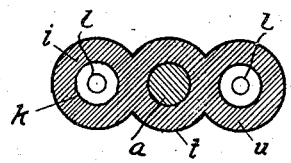
Fig. 3 is a fragmentary detail section on the line 3—3 of Fig. 1.
Figure 1:
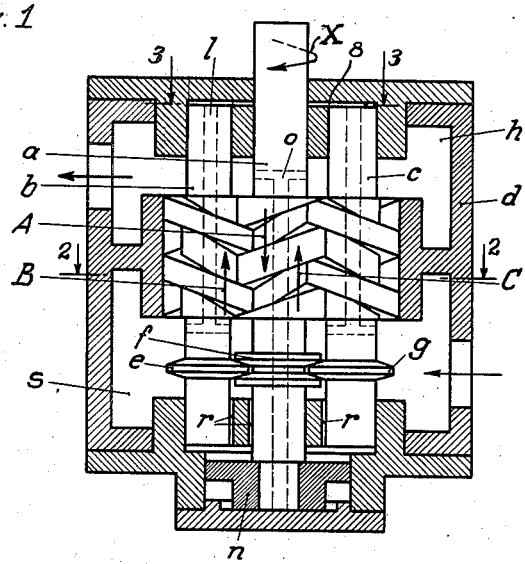
Fig. 1 shows a longitudinal section through a screw pump or axial pump according to the invention equipped with three spindles and Fig. 2 is a cross section through the pump taken on the line 2—2 of Fig. 1.
Figure 2:
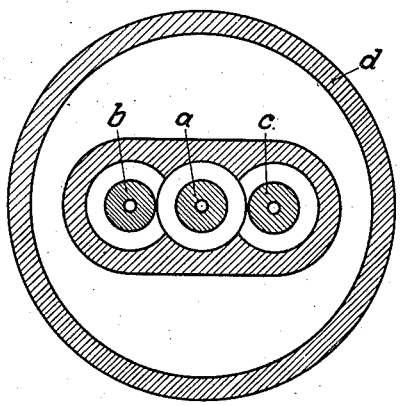

On rotation of the main spindle $a$ in the direction of the arrow X shown in Fig. 1, the drive thrust A occurs in the main spindle and drive thrusts B and C of equal value occur in the two secondary spindles. According to the invention these drive thrusts are absorbed by the collars or rings $e$, $f$ and $g$ the conical surfaces of which roll upon each other. The drive thrust between the spindles is, therefore, absorbed by the spindles themselves and does not appear outwardly.

The use of collars or rings instead of gear wheels having inclined teeth has the following advantages.

1. Possibility of an extremely precise manufacture.
2. Smooth running.
3. Low power required.
4. Substantial equal load of all bearings.

A further advantage of the construction according to the invention consists in the release of the collars or rings $e$, $f$ and $g$ of the drive thrust acting upon them by means of the liquid thrust acting upon the spindles. If $h$ is the delivery chamber of the pump, the annular face $i$ thereof may, according to the diameter $m$ of the upper bearing pin, be so dimensioned, that a liquid thrust acts upon the spindle $b$ in a downward direction which completely or partially compensates the upwardly directed thrust action.

The end surface $k$ of the upper bearing pin $b$ causes no liquid thrust, because this face is connected to the suction chamber $s$ by way of bore $l$. The same is true of the upper surface of the bearing pin $c$. In fact, both the pins $b$ and $c$ terminate in an annular chamber $8$ which surrounds the shaft $a$. Therefore, the difference between the drive thrust and the liquid thrust only acts upon the collars or rings $e$, $f$ and $g$. The total liquid thrust upon the surfaces $i$, $t$ and $u$ is compensated by a relief piston $n$ fixed to the spindle $a$. Pressure is caused to act upon the lower face of this piston by way of a bore $o$. The said liquid entering from the bore $o$ then returns without pressure around the periphery of the relief piston $n$ by way of notches or grooves $r$ in the lower bearings, into the suction space $s$ and lubricates these bearings.

What I claim is:

1. In a screw pump, a casing having a central bearing at each end and having a plurality of other bearings at each end equidistantly spaced from each other and equidistant from the central bearings, a central screw impeller having journals mounted in the central bearings, other screw impellers having journals mounted in the remaining bearings, said central screw impeller being of opposite hand to and meshing with the remaining screw impellers, a housing fitting around said screw impellers and supported by the casing to divide the space therein into suction and expulsion chambers, said chambers being provided respectively with inlet and outlet ports, a bevel grooved friction gear on the central impeller, and a friction gear on each of the remaining impellers and having a bevelled face fitting in the groove of the first mentioned friction gear.

2. In a screw pump, a casing having a central bearing at each end and having a plurality of other bearings at each end equidistantly spaced from each other and equidistant from the central bearings, a central screw impeller having journals mounted in the central bearings, other screw impellers having journals mounted in the remaining bearings, said central screw impeller being of opposite hand to and meshing with the remaining screw impellers, a housing fitting around said screw impellers and supported by the casing to divide the space therein into suction and expulsion chambers, said chambers being provided respectively with inlet and outlet ports, said casing being provided at the suction end with a pressure cylinder into which the bearings at said suction end open, one of the journals of the central impeller extending into said cylinder, a piston fixed on said last journal in said cylinder, said central impeller being provided with a duct extending from the expulsion chamber and opening through the end of the last mentioned journal, a bevel grooved friction gear on the central impeller, and a friction gear on each of the remaining impellers and having a bevelled face fitting in the groove of the first mentioned friction gear.

3. In a screw pump, a casing having a central bearing at each end and having a plurality of other bearings at each end equidistantly spaced from each other and equidistant from the central bearings, a central screw impeller having journals mounted in the central bearings, other screw impellers having journals mounted in the remaining bearings, said central screw impeller being of opposite hand to and meshing with the remaining screw impellers, a housing fitting around said screw impellers and supported by the casing to divide the space therein into suction and expulsion chambers, said chambers being provided respectively with inlet and outlet ports, said casing being provided at the suction end with a pressure cylinder into which the bearings at said suction end open, one of the journals of the central impeller extending into said cylinder, a piston fixed on said last journal in said cylinder, said central impeller being provided with a duct extending from the expulsion chamber and opening through the end of the last mentioned journal, said remaining impellers being each provided with a duct leading from the suction chamber and opening through the end of the journal of the impeller at the expulsion end of the casing, a pressure chamber formed in the journals for said last named impellers at the expulsion end of said casing, said last named ducts opening into said last named chamber, a bevel grooved friction gear on the central impeller, and a friction gear on each of the remaining impellers and having a bevelled face fitting in the groove of the first mentioned friction gear.

FRANZ BURGHAUSER.